INVENTOR.
HEINZ JOSEPH GERBER
BY
McCormick, Paulding & Huber
ATTORNEYS.

United States Patent Office 3,445,741
Patented May 20, 1969

3,445,741
FRACTIONAL STEP ROTARY STEPPING MOTOR AND CONTROL SYSTEM THEREFOR
Heinz Joseph Gerber, West Hartford, Conn., assignor to The Gerber Scientific Instrument Company, South Windsor, Conn., a corporation of Connecticut
Filed Apr. 17, 1967, Ser. No. 631,253
Int. Cl. H02k *37/00*
U.S. Cl. 318—138                                  10 Claims

ABSTRACT OF THE DISCLOSURE

A stepping motor wherein the rotor is caused to move through a large number of discrete steps throughout the one complete cycle of energization defined as 360 electrical degrees of rotation. In comparison with prior art stepping motors, the equivalent of one full step of previous motors is broken down into a larger number of smaller or fractional steps. This is accomplished by varying the energization of the stator windings between a number of levels including one or more levels in addition to the zero, positive one unit and negative one unit levels customarily used in prior motors.

Background of the invention

This invention relates to electric motors and deals more particularly with motors of the impulse type, commonly referred to as stepping motors, wherein the rotor of the motor is moved through a number of discrete movements or steps as a result of a corresponding number of discrete changes in the energization scheme of the motor windings.

In stepping motors of the type with which this invention is concerned, the motor generally consists of a rotor adapted for connection with a mechanical load and a stator having a number of poles and windings. A suitable electrical drive logic or control unit constitutes part of the motor and operates to energize the windings in such a manner as to create an internal magnetic field which produces a torque that urges the rotor to assume a mechanical position in line with the resultant magnetic field. The drive logic changes the energization of the windings in a sequential step-by-step fashion, to cause the magnetic field to move in a similar step-by-step fashion. As the magnetic field moves, the rotor follows it and moves with a corresponding step-by-step movement. Depending on the number of leads or windings available as separate inputs, the motor may require three, four, five or more changes in the winding energization scheme to achieve a complete cycle of energization, generally defined as 360 electrical degrees of rotation. The actual mechanical rotation of the rotor produced by 360 electrical degrees of rotation is in turn dependent upon the geometry and design of the particular motor, but some definite number of discrete steps and definite amount of angular mechanical movement is always prevalent during each 360 degrees of electrical rotation. In a simple motor, one full rotation of the rotor may result from 360 electrical degrees of rotation with 4 steps being required to achieve such rotation. In other motors, 200 steps or more may be required to obtain 360 mechanical degrees of rotation of the rotor with such mechanical rotation being equivalent to a large number of full cycles of electrical energization.

The precision with which the motor is capable of indexing the rotor is, of course, dependent on the number of steps or changes in electrical energization required to complete one full revolution of the rotor, and attempts have been made to increase the precision by increasing the number of steps required per revolution of the rotor. Generally such attempts have been directed to increasing the number of poles and windings in the motor, but this can be carried only to a cartain point without exceeding practical size and other limitations. The patent to Fredrickson, No. 3,077,555, shows another way of increasing the number of steps required to produce one full revolution of the rotor by a unique scheme for energizing the windings whereby the rotor instead of being urged to move one full step with each change in energization moves only the equivalent of one-half a step.

Summary of the invention

The general aim of this invention is to provide a stepping motor capable of precisely indexing its rotor, and a driven part connected thereto, as a result of its requiring a very large number of steps or changes in its energization scheme to produce one full complete revolution of the rotor.

A more particular object of this invention is to provide a stepping motor wherein the windings of the motor are energized in such a manner that a number of changes in energization are required to cause the rotor to move through what would conventionally constitute one full step.

These objects and other objects and advantages of the invention are achieved by energizing each winding or pole of the stator at a number of different energization levels by a control unit which controls the current flowing through each winding and provides for at least one current level in addition to a zero level and a negative or positive maximum level.

Brief description of the drawings

FIG. 6 is a fragmentary schematic diagram showing a part of another circuit for energizing the windings of a stepping motor in accordance with this invention.

FIG. 7 is another fragmentary diagram illustrating still another circuit for energizing the windings of a stepping motor in accordance with this invention.

Description of the preferred embodiments

Figure 1:
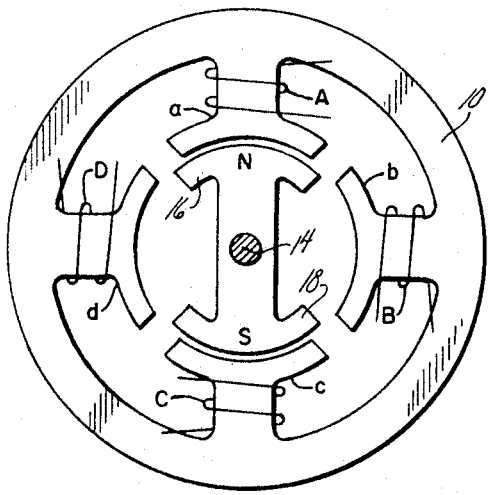
FIG. 1 is a somewhat schematic cross-sectional view taken through a simple stepping motor of a type which may be used in practicing the present invention.

Turning now to the drawings, and first considering FIG. 1, this figure shows in somewhat schematic form a simplified stepping motor of a type which may be employed in practicing the present invention. This stepping motor consists of a stator 10 having four equally angularly spaced poles *a*, *b*, *c*, and *d* which carry windings A, B, C, and D respectively. A rotor 12 is supported for rotation about a central axis 14 relative to the stator 10 and has two poles 16 and 18 which cooperate with the poles of the stator. The rotor is, or includes, a permanent magnet which acts to produce a north magnetic polarity at the pole 16 and a south magnetic polarity at the pole 18.

In conventional operation of the motor 10, according to the prior art, the windings A, B, C and D are energized by a unidirectional current which flows through the windings in such a manner as to produce a south magnetic polarity at the inner tip of the associated pole. That is, when the winding A is energized, it produces a magnetomotive force in such a direction as to create a sotuh magnetic polarity at the tip of the pole *a* and thereby causes this tip to attract the north pole 16 of the rotor 12. Similarly, when the windings B is energized this produces a south magnetic polarity at the inner tip of the pole *b* which also attracts the north pole 16 of the rotor 12. Step-by-step rotation of the rotor 12 is therefore obtained by energizing the windings separately and in a step-by-step sequence. Energizing them in the sequence A, then B, then C, and then D causes the rotor to rotate in the clockwise direction. Energizing them in the sequence A, then D, then C, and then B causes the rotor to operate in the counterclockwise direction. With each change in energization the rotor moves 90 mechanical degrees and in this case this is equal to 90° of electrical rotation, a full cycle of energization wherein all four of the windings are energized in sequence and brought back to their initial states of energization being referred to as 360° of electrical rotation. It should be understood, however, that the motor 10 is shown for purposes of explanation only and that most stepping motors of this type which are now used include more stator poles and a corresponding larger number of rotor poles than shown by the motor 10.

An alternate conventional way of energizing the windings of a motor such as that shown in FIG. 1 is to energize the windings in such a manner as to selectively produce either a north or a south polarity at the tip of the associated stator pole. This may be done either by providing two windings on each stator pole or by using suitable switching to allow the reversal of the direction in which the current flows through a winding. In the case of two windings on each stator pole, one winding is energized to produce one magnetic polarity at the associated pole tip and the other winding is energized to produce the opposite magnetic polarity at the same pole tip. The energization scheme in turn is such that whenever one winding is energized to cause its pole to attract the north pole 16 of the rotor the complementary winding is also energized to cause its associated pole to attract the south pole 18 of the rotor. Thus, in the case of the motor 10 as shown in FIG. 1, when the winding A is energized to produce a south polarity at its associated pole tip the winding C is simultaneously energized to produce a north magnetic polarity at its associated pole tip. If $A_n$, $B_n$, $C_n$, and $D_n$ are taken to represent energization of the windings A, B, C, D to produce north magnetic polarities at their associated pole tips, and if $A_s$, $B_s$, $C_s$, and $D_s$ are taken to represent energization of the same windings to produce south magnetic polarities at their pole tips, the sequence of winding energization to obtain clockwise rotation of the rotor is $A_s$ and $C_n$, then $B_s$ and $D_n$, then $C_s$ and $A_n$, and then $D_s$ and $B_n$. Counterclockwise rotation of the rotor is obtained by energizing in the sequence $A_s$ and $C_n$, then $D_s$ and $B_n$, then $C_s$ and $A_n$, and then $B_s$ and $D_n$.

In each of the conventional energization schemes described above the rotor 12 moves 90 mechanical degrees with each change in the energization of the motor windings. This movement is commonly referred to as one full step, and in the stepping motor system of the present invention the windings are energized in such a way that the rotor with each change in the winding energization moves only a fraction of a full step movement. This is accomplished both by energizing adjacent stator windings during some phases of the energization scheme to produce a resultant magnetic field vector located between the two associated adjacent stator poles and also by varying the energization of the windings between a number of different levels including at least a maximum level of one polarity and a lower or intermediate level of the same polarity.

Figure 2:
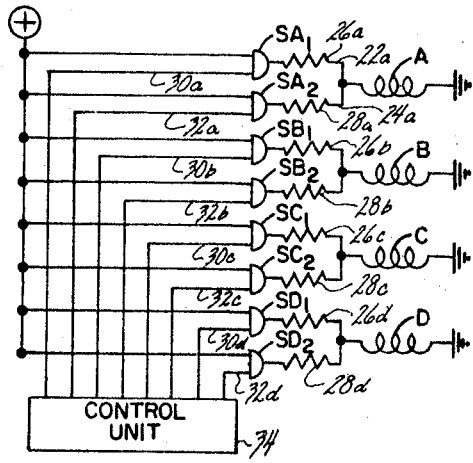
FIG. 2 is a schematic diagram of an electrical circuit for energizing the windings of the stepping motor of FIG. 1 in accordance with the present invention.

FIG. 2 shows an exemplary circuit which may be used for energizing the windings of the motor 10 in accordance with the invention. Referring to this figure, the winding A has one end grounded and has its other end connected to asource of positive voltage, indicated at 20, through two separate circuits represented by the lines 22a and 24a. The line 22a includes a resistor 26a and a switch $SA_1$, and the line 24a includes a resistor 28a and a switch $SA_2$. The switches $SA_1$ and $SA_2$ are electrical switches, preferably transistors, opened and closed in response to signal supplied thereto by control lines 30a and 32a connected to a control unit 34, the control unit 34 being a suitable logic unit or the like for generating in the proper sequence the signals applied to the switch control lines 30a and 32a and similar control lines associated with the other windings. Each of the other windings B, C and D are grounded and connected to the source 20 by circuits similar to that for the winding A, the circuit components associated with these windings being given the same reference numerals as those for the winding A except for appropriate change in the subscript. The resistors 26 and 28 associated with each winding are such that, taking the winding A for example, when the switch $SA_1$ is closed and the switch $SA_2$ open the current flowing to the winding A applies an intermediate value of magnetomotive force to the associated pole *a*, which in turn produces an intermediate value of flux well below the saturation level in the pole when the rotor is aligned therewith. When the switch $SA_1$ and the switch $SA_2$ are both closed a greater or maximum amount of current flows through the winding A and applies a greater or maximum value of magnetomotive force to the associated pole. More particularly, the resistors 26 and 28 for each winding circuit are so chosen that when only the first switch, such as the switch $SA_1$, is closed the resulting magnetic torque exerted on the rotor is approximately one half the torque produced for the same position of the rotor when both of the switches, such as the switches $SA_1$ and $SA_2$, are closed. In the description which follows the energization of a winding caused by the closing of only the first of its switches is referred to as half energization and the energization achieved by closing both of its switches is referred to as full energization.

Figure 3:
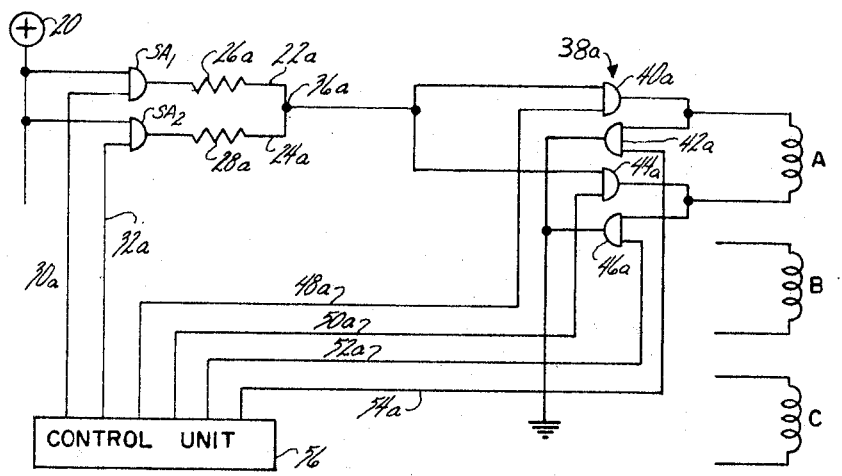
FIG. 3 is a diagram showing the conditions of the various switches of the circuit of FIG. 2 for various positions of the motor rotor.
Figure 4:
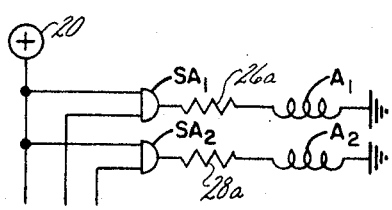
FIG. 4 is another diagram illustrating the condition of energization of the motor windings for various rotor positions.
Figure 3:
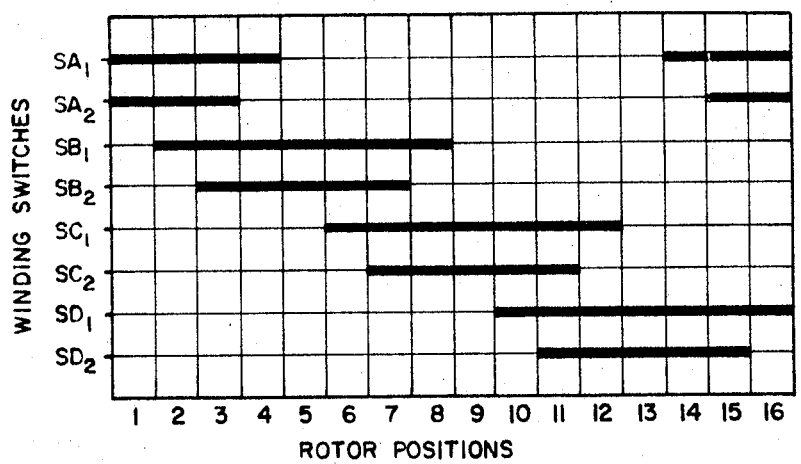
Figure 4:
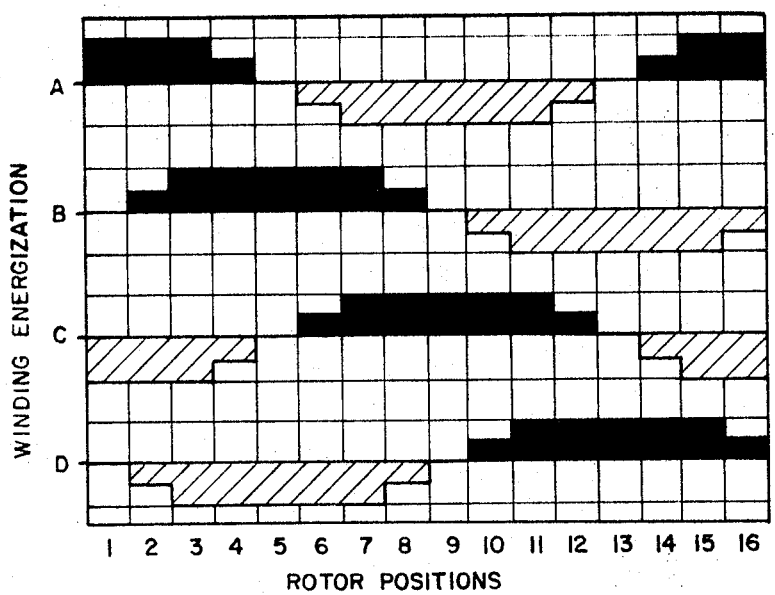

FIG. 3 shows the manner in which the various switches of the FIG. 2 circuit are operated to energize the windings A, B, C, D, and FIG. 4 shows the resulting energization of the windings. In FIG. 3 the presence of a horizontal bar at a given rotor position indicates that the corresponding switch is closed, and the absence of such a bar indicates that the corresponding switch is open. In FIG. 4 only the black horizontal bars are pertinent to the FIG. 2 system. The presence of a vertically narrow black horizontal bar at a given rotor position indicate that the corresponding winding is half energized and the presence of a vertically wide black horizontal bar indicates that the corresponding winding is fully energized. The absence of any black horizontal bar indicates that the associated winding is deenergized.

In considering FIGS. 3 and 4, it will be noted that the energization scheme is such that at the first rotor position the switches $SA_1$ and $SA_2$ are closed to fully energize the winding A. In the second rotor position the switches $SA_1$ and $SA_2$ remain closed and a switch $SB_1$ is additionally closed. Accordingly, as hsown in FIG. 4, in the second rotor position the winding A is fully energized and the winding B half energized. In the third rotor position the switches $SA_1$, $SA_2$, $SB_1$ and $SB_2$ are all closed to fully energized both the windings A and B. In the fourth rotor position the switches $SA_1$, $SB_1$ and $SB_2$ are closed to fully energize winding B and to half energize a winding A. In the fifth position switches $SB_1$ and $SB_2$ are closed to fully energize winding B. The subsequent operation of the switches and the energization of the windings effected at the other rotor positions will be evident by following through with FIGS. 3 and 4.

Figure 5:
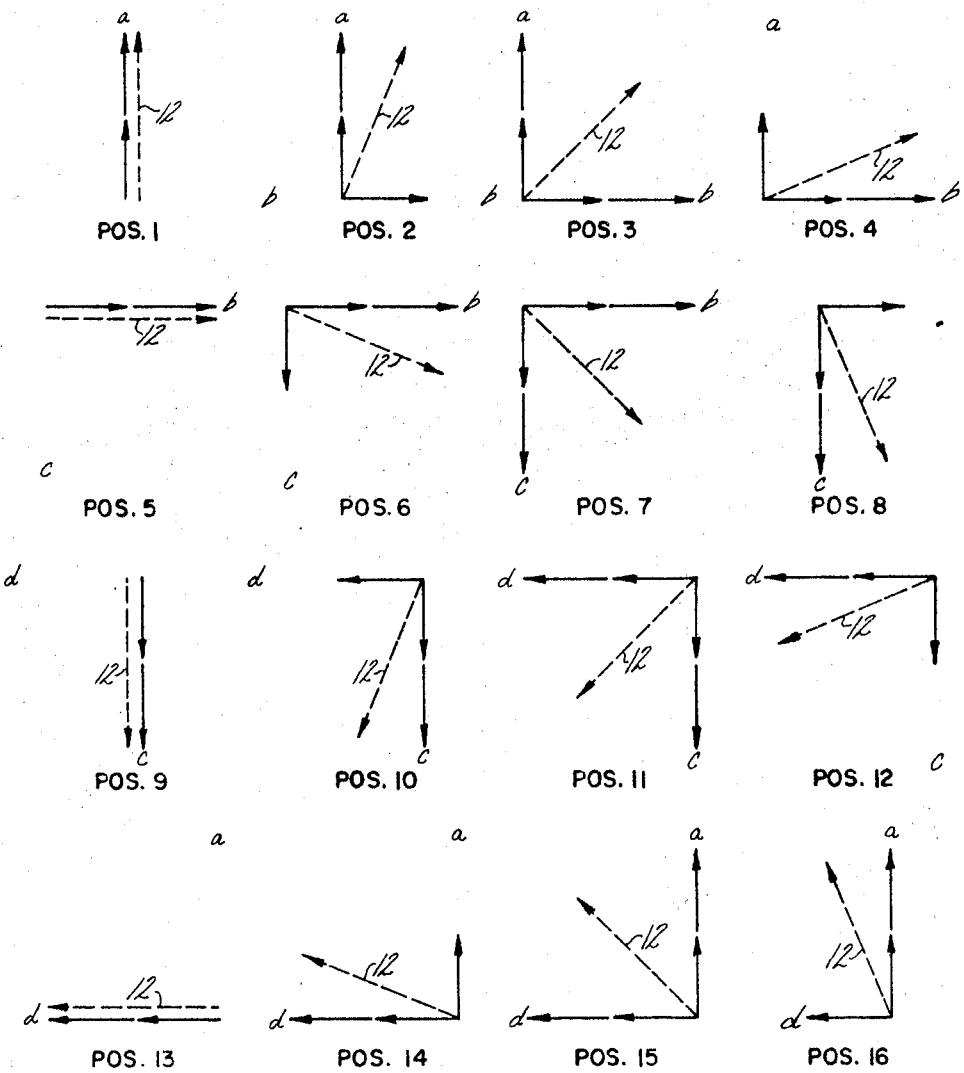
FIG. 5 is a diagram illustrating the directions of the magnetic fields produced by the windings and the resu'tant rotor positions produced by such fields.

The movement of the rotor effected by the energization scheme shown in FIG. 4 may best be understood by reference to FIG. 5. In this figure the solid arrows are somewhat in the nature of unit vectors with each representing the magnetic torque imposed on the rotor by a half energization of the associated winding. Two such vectors placed end to end therefore represent full energization of a winding. Upwardly pointing solid arrows represent energization of the A winding, downwardly pointing solid arrows represent energization of the C winding, rightwardly pointing solid arrows represent energization of the B winding, and leftwardly pointing solid arrows represent energization of the D winding. The broken arrow represents the position of the rotor. In the first position of the rotor the winding A is fully energized by itself to cause the rotor to align itself with a $a$ pole. In the second position the winding A is fully energized and the winding B half energized to cause the rotor to move to the position shown at position 2 in FIG. 5 at which it is displaced approximately twenty-two and a half degrees counterclockwise from its first position. In position 3 the winding A and the winding B are both fully energized to cause the rotor to assume a position approximately half way between the poles A and B, or 45° from the first position. In position 4 the winding A is half energized and the winding B fully energized to cause the rotor to move approximately another twenty-two and half degrees in the clockwise direction. In following through with the various positions shown in FIG. 5 it will be noted that with each change in its position the rotor moves approximately twenty-two and a half degress in the clockwise direction from its former position, sixteen steps or changes in position therefore being required to cause the motor to transverse one full mechanical revolution and one full electrical cycle.

The sequence in which the switches are operated, as shown by FIG. 3, and the resulting energization of the windings, as shown by FIG. 4, produce a clockwise rotation of the rotor as will be evident from FIG. 5. It will also be evident that counterclockwise rotation of the rotor may be obtained by reversing the sequence of switch operation shown in FIG. 3. The control unit 34 for operating the various switches $SA_1$ through $SD_2$ may take various different forms and by itself forms no part of this invention. Generally the unit is a device which operates in response to commands supplied thereto in the form of input pulses and a direction signal, the unit operating to change the state of energization of the windings from one state to the next for each received pulse with the direction of change being commanded by the direction control signal.

FIG. 6 shows a fragment of a stepping motor system embodying this invention and utilizing two windings rather than one on each pole of the motor. The windings $A_1$ and $A_2$ of FIG. 6 are both located on the pole $a$ of a motor otherwise similar to that shown at 10 in FIG. 1, and similar pairs of windings (not shown) are also provided for the poles $b$, $c$, $d$. A resistor $26a$ and switch $SA_1$ are connected in series with the winding $A_1$ between ground and the positive voltage source 20 and a resistor $28a$ and switch $SA_2$ are connected in series with the winding $A_2$ between ground and the source 20. Operation of the switches $SA_1$ and $SA_2$ and other similar switches associated with the other windings of the other poles is the same as that shown in FIG. 3, the only difference being that two windings rather than one are used to apply a magnetomotive force to the associated pole. That is, to produce a half energization of the pole $a$ the switch $SA_1$ is closed by itself to energize only the winding $A_1$. To produce a full energization both the switches $SA_1$ and $SA_2$ are closed to energize both windings $A_1$ and $A_2$.

FIG. 7 is a fragmentary schematic diagram showing another way of energizing the motor 10 of FIG. 1 to produce a fractional step stepping of the rotor in accordance with this invention. This system utilizes a reversal of the current in the windings to allow the simultaneous energization of complementary pairs of stator windings. In the figure only the electrical circuit associated with the winding A is shown, but similar circuits are also provided for the windings B, C and D.

The circuit of FIG. 7 is similar to that of FIG. 2 except for including a switching means for reversing the flow of current through each winding so that when one winding is energized to produce a north magnetic polarity at its associated pole tip the complementary winding may be energized to produce a south magnetic polarity at its associated pole tip. More particularly, the circuit associated with the winding A includes two suppy lines $22a$ and $24a$ connected to the source 20 of positive voltage, the line $22a$ including a resistor $26a$ in series with the switch $SA_1$ and the line $24a$ including a resistor $28a$ in series with the switch $SA_2$. The negative ends of the resistors are in turn connected to a common point $36a$. A switching means, indicated generally at $38a$, is located between the common point $36a$ and the winding A and is operable to connect the two ends of the winding A to the point $36a$ and to ground, respectively, in either a forward or a reverse fashion to cause current to flow through the winding in either a forward or reverse direction. The switching means $38a$ may take various different forms but in the illustrated case is shown to consist of four switches $40a$, $42a$, $44a$ and $46a$ each of which may comprise a transistor and each of which is shifted between open and closed states in response to signals appearing on associated control lines $48a$, $50a$, $52a$, and $54a$ connected with a control unit 56 with operates to generate the proper signals required for operating the switches in the desired sequence. The switches $40a$ and $44a$ are connected to the common point $36a$ and the switches $42a$ and $46a$ are connected to ground. To obtain a forward flow of current through the winding A the switches $40a$ and $46a$ are opened and the switches $42a$ and $44a$ are closed. To obtain a reverse flow of current through the winding A the switches $44a$ and $42a$ are opened and the switches $40a$ and $46a$ are closed.

The operation of the FIG. 7 system is the same as the operation of the FIG. 2 system except the whenever the winding A is energized the winding C is also energized to the same level but in the opposite direction. Similarly when the winding B is energized the winding D is energized to the same level but in the opposite direction, when the winding C is energized the winding A is energized to the same level but in the opposite direction, and when the winding D is energized the winding B is energized to the same level but in the opposite direction. This energization of the windings may be best understood by reference to FIG. 4 and taking into consideration both the solid black horizontal bars and the crosshatched horizontal bars. The solid black horizontal bars represent energization of the windings to produce south magnetic polarities at the corresponding pole tips and the cross-hatched horizontal bars represent energization of the windings to produce north magnetic polarities at the corresponding pole tips. Therefore, from FIG. 4, it will be noted that in the first rotor position the winding A and the winding C are fully energized, the winding A being energized in the south direction and the winding C in the north direction. In the second rotor position the windings A and C are fully energized in opposite directions and the windings B and D are also half energized in opposite directions. In the third rotor position all windings are fully energized but with the windings A and B being energized to produce south polarity pole tips and with the windings C and D being energized to produce north polarity pole tips. The state of energization at the other rotor positions will be fully evident from FIG. 4.

The drawings and the description presented above relate to preferred embodiments of the invention, but it should be understood that various changes may be made from the constructions disclosed, and that the drawings and description are not to be construed as defining or limiting the scope of the invention, the claims forming a part of this specification being relied upon for that purpose. It should be particularly noted that still further division of the rotor movement may be obtained by providing for a larger number of levels of energization between which the windings are switched and is a part of the present invention. Also, it should be understood that the invention is not limited to use with a drive system having a single stepping motor with a single stator and rotor and that it may as well be used with motors having multiple stators and/or rotors. It may also be applied to drive systems including a composite motor made up of a plurality of individual stepping motors having their rotors fixed to a single shaft or otherwise mechanically interconnected for rotation in unison, and in the claims which follow the term "motor" is intended to include such a composite motor.

The invention claimed is:

1. In a stepping motor having a rotor, a stator having poles, a plurality of windings on said stator poles, and means for energizing said windings in such a manner that the energization scheme thereof is changed in a step-by-step sequence to produce a step-by-step change in the magnetization of said stator poles and an accompanying step-by-step movement of said rotor, the improvement consisting of said means for energizing said windings including means for varying and controlling the energization such that the magnetomotive force applied to each of said stator poles is varied throughout said sequence between a number of discrete levels including at least a maximum level of one polarity and a lower level of the same polarity.

2. An improved stepping motor as defined in claim 1 further characterized by said means for varying the energization being such that the magnetomotive force applied to each of said stator poles is varied throughout said sequence between a number of discrete levels including at least a maximum level of one polarity, a lower level of the same polarity and a substantially zero level.

3. An improved stepping motor as defined in claim 1 further characterized by said means for varying the energization being such that the magnetomotive force applied to each of said stator poles is varied throughout said sequence between a number of discrete levels including at least a maximum level of one polarity, a lower level of the same polarity, a zero level, a maximum level of the opposite polarity and a lower level of said opposite polarity.

4. An improved stepping motor as defined in claim 1 further characterized by there being at least one winding on each of said stator poles and said means for varying the energization including at least two separate circuits connected with said at least one winding for energizing the same, each of said two circuits being connected in series with said at least one winding and in parallel with each other, at least one of said two circuits having a substantial electrical resistance and each of said circuits including a switching means for opening and closing the associated circuit for the flow of current therethrough.

5. An improved stepping motor as defined in claim 4 further characterized by said means for varying the energization further including means for closing the switching means of both of said two circuits during some phases of said step-by-step sequence, for closing only one of said switching means during other phases of said sequence, and for opening both of said switching means during still other phases of said sequence.

6. An improved stepping motor as defined in claim 1 further characterized by there being at least two windings on each of said stator poles and said means for varying the energization including two separate circuits each connected in series with a respective one of said windings, at least one of said two circuits having a substantial electrical resistance and each of said circuits including a switching means for opening and closing the circuit for the flow of current therethrough.

7. An improved stepping motor as defined in claim 6 further characterized by said means for varying the energization further including means for closing the switching means of both of said two circuits during some phases of said step-by-step sequence, for closing only one of said switching means during other phases of said sequence, and for opening both of said switching means during still other phases of said sequence.

8. An improved stepping motor as defined in claim 1 further characterized by there being at least one winding on each of said stator poles and said means for varying the energization including at least two separate circuits in parallel with one another and conencted to a common point, at least one of said two circuits having a substantial electrical resistance and each of said circuits including a switching means for opening and closing the associated circuit for the flow of current therethrough, and switching means connected between said common point and the associated winding selectively operable to cause the current from said common point to flow through said winding in either a forward or reverse direction.

9. An improved stepping motor as defined in claim 8 further characterized by said means for varying the energization further including means for closing the switching means of said two circuits during some phases of said step-by-step sequence, for closing only one of said switching means during other phases of said sequence, and for opening both of said switching means during still other phases of said sequence.

10. An improved stepping motor as defined in claim 9 further characterized by said means for varying the energization further including means for operating said switching means between said common point and said winding so as to cause current to flow through said winding in the forward direction during some phases of said step-by-step sequence and so as to cause said current to flow through said winding in the reverse direction during other phases of said sequence.

References Cited

UNITED STATES PATENTS

| | | | |
|---|---|---|---|
| 3,077,555 | 2/1963 | Fredrickson | 318—254 |
| 3,117,268 | 1/1964 | Madsen | 318—283 |
| 3,239,738 | 3/1966 | Welch | 318—138 |
| 3,374,410 | 3/1968 | Cronquist et al. | 318—138 |

WARREN E. RAY, *Primary Examiner.*

U.S. Cl. X.R.

310—49